(12) United States Patent
Covezzi et al.

(10) Patent No.: US 7,041,750 B1
(45) Date of Patent: May 9, 2006

(54) PROCESS AND APPARATUS FOR MAKING SUPPORTED CATALYST SYSTEMS FOR OLEFIN POLYMERIZATION

(75) Inventors: Massimo Covezzi, Ferrara (IT); Anna Fait, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 875 days.

(21) Appl. No.: 09/913,385

(22) PCT Filed: Dec. 14, 2000

(86) PCT No.: PCT/EP00/12930

§ 371 (c)(1),
(2), (4) Date: Aug. 13, 2001

(87) PCT Pub. No.: WO01/44319

PCT Pub. Date: Jun. 21, 2001

(30) Foreign Application Priority Data

Dec. 16, 1999 (EP) .................................. 99204345

(51) Int. Cl.
*C08F 2/04* (2006.01)
*C08F 2/34* (2006.01)

(52) U.S. Cl. ........................... 526/68; 526/69; 526/71; 526/86; 526/87; 526/901

(58) Field of Classification Search ............... 526/68, 526/69, 71, 86, 87, 901
See application file for complete search history.

(56) References Cited

U.S. PATENT DOCUMENTS

| 4,220,803 A | | 9/1980 | Marcinkowsky et al. ... 562/538 |
| 5,424,262 A | * | 6/1995 | de Lasa et al. ................ 502/64 |
| 5,625,015 A | | 4/1997 | Brinen et al. ................ 526/160 |

FOREIGN PATENT DOCUMENTS

| EP | 0129368 | 12/1984 |
| EP | 0209253 | 1/1987 |
| EP | 0416815 | 3/1991 |
| EP | 0420436 | 4/1991 |
| EP | 0431648 | 6/1991 |
| WO | 9511263 | 4/1995 |
| WO | 9614155 | 5/1996 |
| WO | 9623010 | 8/1996 |

OTHER PUBLICATIONS

T. Kamfjord et al., Macromol. Rapid Commun., 19: 505-509 (1998).

* cited by examiner

*Primary Examiner*—Robert D. Harlan
(74) *Attorney, Agent, or Firm*—William R. Reid; Jarrod N. Raphael

(57) ABSTRACT

A process to support a homogeneous catalyst on a porous solid support is performed in two separate zones. In the first zone the solid is contacted, under stirring, with an amount of a catalyst solution lower than the total pore volume of the solid. In the second zone the solid is dried from the solvent while flowing under pneumatic conveying. A loop circulation of solid is established between the two zones, so that the solid is subject to more contacting steps. The process is particularly suitable to support a metallocene-alumoxane polymerization catalyst on a porous prepolymer. The process can be advantageously performed in continuous, thus fitting the needs of an industrial scale production process.

24 Claims, 1 Drawing Sheet

Figure 1:
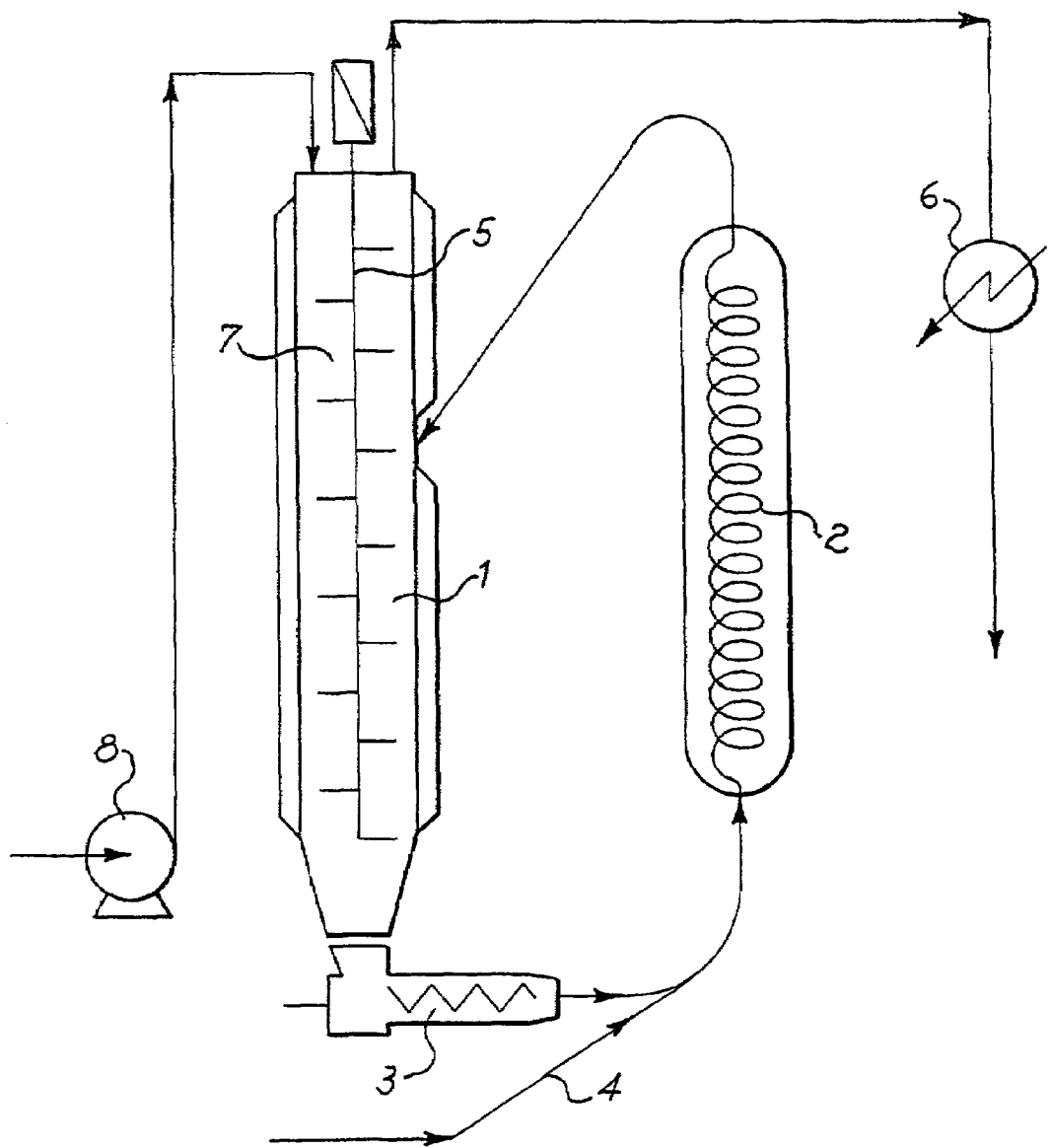

PROCESS AND APPARATUS FOR MAKING SUPPORTED CATALYST SYSTEMS FOR OLEFIN POLYMERIZATION

The present invention relates to a method of producing a supported catalyst system for use in olefin polymerisation, and to an apparatus used in such a method. Particularly, this invention relates to the production of a metallocene-based catalyst supported on a porous material, such as a porous olefin polymer, silica or any other suitable porous material.

It is desirable in the industrial practice to render heterogeneous metallocene-alumoxane catalysts for, among other reasons, improving polymer morphology and reducing reactor fouling. Typically, one or more catalytic components are supported on a porous support. Usually, the metallocene is deposited on the support from a solution. At the same time or separately an activator, such as methylalumoxane (MAO), and/or an alkylaluminium compound and/or an ionising activator is/are deposited on the support. The catalyst may be dissolved in one or more liquid monomers or in a solvent containing one or more monomers. The monomer used is allowed to polymerise during the impregnation of the support or the evaporation of the solvent.

U.S. Pat. No. 5,625,015 describes a process for depositing a catalyst on a porous solid support by spraying a catalyst solution on the solid material kept under agitation. The volume of solution must be more than the total volume of the pores of the treated material, but less than the volume of solution at which a slurry with the solid would be generated. After this impregnation step, the solvent may be evaporated to allow the catalytic compounds to deposit on the support.

Kamfjord, Wester and Rytter in Macromol. Rapid Commun. 19, 505–509 (1998), describe the preparation of a silica supported metallocene/MAO catalyst according to the "incipient wetness" method. This method provides a route for depositing a dissolved substance onto a solid support. The principle of this method is to add only enough of the solution to fill the pores of the support, in order to allow the solute to be evenly distributed in the pores of the support. A problem with this technique is that, by pouring the solution over the support using the traditional batch or dropwise technique, a local overwetting may occur, especially when the catalyst is prepared on a large scale and when the support has a medium-low porosity. The uneven distribution of the catalytic system, due to the localised wetting, can affect locally the heat and mass transfer during the polymerisation generating a poor process control and in some cases producing also fines.

The methods according to the prior art improve the distribution of the catalyst and are suited when the solid support is capable of chemically binding the catalytic compound, as it happens when silica is employed. This is not yet sufficient when, as it happens when a polymeric material is used, the support material has no affinity with the catalytic compound.

An improved supportation of catalyst components on porous substrates is achieved according to the invention by a process for preparing a supported catalyst comprising the steps of:

(a) preparing a catalyst solution comprising a soluble catalyst component;
(b) introducing into a contacting vessel:
   (i) a porous support material in particle form, and
   (ii) a volume of the catalyst solution not greater than the total pore volume of the porous support material introduced;
(c) discharging the material resulting from step (b) from the contacting vessel and introducing it into an evaporation zone where it is suspended in an inert gas flow under such conditions that the solvent evaporates; and
(d) reintroducing at least part of the material resulting from step (c) into the contacting vessel together with another volume of the catalyst solution not greater than the total pore volume of the reintroduced material.

To maximise the amount of catalyst component(s) deposited on the support particles the material resulting from step (d) can be subjected to further cycles of steps (c) and (d). The supported catalyst can be suitably recovered after a drying step (c).

In order to ensure a good homogenisation of the system, the contacting vessel is preferably kept under stirring.

A major advantage of the present process is the simultaneous accomplishment of impregnation and evaporation treatments on the support particles in different zones, without the need of discontinuing the impregnation to evaporate the solvent.

The process can suitably be performed in a loop reactor in which the support particles are recirculated and where, in a contacting vessel the solution(s) of the catalyst components is/are added continuously and in an evaporation zone the solvent is continuously evaporated in order to maintain a free-flowing solid.

According to a preferred embodiment of the invention, the gas stream used to suspend the solid particles in the evaporation zone is also used for pneumatically circulating the solid through the reactor. The solid discharged from the contacting vessel is entrained by the said gas stream, from which it is separated before or upon being reintroduced into the contacting vessel. Nitrogen is a preferred inert gas used to generate the said gas stream and to dry the impregnated solid particles.

The process of the invention can be performed in a semi-continuous or, preferably, in a continuous mode. In the case of semi-continuous operation, the solid material is loaded into the loop reactor and, after having been contacted with the desired amount of solution within a number of passages through the contacting vessel and the evaporation zone, it is discharged. The discharging is preferably made from a point of the loop where the solid has been freed from the solvent, i.e. after it has left the evaporation zone, while being kept circulating in the loop. In the case of continues operation, the solid is continuously fed at a suitable point, preferably directly into the contacting vessel, and it is withdrawn at any suitable point, preferably where it is free of the solvent and more preferably where it comes out from the evaporation zone. Inert gas is continuously fed, preferably at the point of discharge of the solid from the contacting vessel and inert gas containing solvent is withdrawn from any suitable point.

The ratio of the solid recycled in the loop to the solid withdrawn and the flow of feed solution must be calculated in order to assure a sufficient average number of passages of the solid through the contacting vessel. The average number of passages is preferably above 5, more preferably above 10, and may reach values of 50 and more.

It is not required that all the solvent absorbed by the solid is evaporated in each passage through the evaporation zone. In fact, when a porous prepolymer is used, the solvent besides being typically absorbed in the pores of the particle, it also diffuses into the polymeric material, thus causing a swelling thereof. This amount of diffused solvent does not prevent fresh solution to enter the pores in a subsequent contacting step, thus it is not necessary to eliminate it before the solid is fed again into the contacting vessel. The total evaporation at this stage would require an unnecessarily long residence time in the evaporation zone. On the contrary, the solid is generally totally freed from the solvent when it is discharged from the apparatus. When operations are carried out in a semi-continuous mode, this may be achieved by maintaining the solid in circulation through the apparatus for a sufficient time after feeding of fresh solution has been terminated. When the process is carried out continuously, it is preferred that the apparatus is provided with a secondary evaporation zone, through which the solid is made to flow after having been discharged from the circulation loop comprising the contacting vessel and the previously mentioned evaporation zone. Since the solution provokes the swelling of the solid, this must be taken into consideration when calculating the size of the components of the apparatus. For instance, a solid prepolymer containing a residual amount of a solvent such as toluene diffused into the material, after the evaporation step can present an increase of weight, with respect to the dry polymer, of about 8%.

The process according to the present invention allows a uniform distribution of the catalytic system over the surface area of the porous particles, which provides an industrially useful supported catalyst with good morphology, high activity and reduced fouling.

As used herein, "support" means any support material, preferably a porous material such as inorganic oxides, inorganic chlorides and resinous material such as polyolefins or polymeric compounds or any other organic support material. Particularly preferred support materials are olefin polymers and prepolymers, generally obtained from a Ziegler-Natta catalyst system, and inorganic oxides, such as silica. In addition inorganic chlorides, such as magnesium dichloride, can suitably be used. Generally, the support material is not active in the polymerisation of olefins. Moreover, it may be either partially or totally dehydrated.

Preferably the support has an average particle size in the range of from about 10 to about 1000 μm, a surface area in the range of from about 1 to about 500 m²/g and a porosity in the range of from about 0.1 to about 2 ml/g (excluding macropores, i.e. pores with a diameter above 10 μm). The support pore size, in terms of the average diameter of the pores, is generally in the range of from about 0.01 to about 2 μm. Typical values of porosity for inorganic oxides, such as silica and alumina, are from 0.9 to 1.7 ml/g. When a porous prepolymer is used as support material, its porosity is preferably at least 0.3 ml/g. Prepolymers with higher values of porosity, such as above 0.7 ml/g and even of 1.5 ml/g or more, can advantageously be employed.

The process according to the invention is suitable to prepare supported polymerisation catalysts, particularly for olefin polymerisation. The process of the invention is especially suitable for supporting metallocene-based catalyst systems, such as those described in EP 129 368. Other homogeneous catalytic systems that can be supported are mono-cyclopentadienyl catalyst systems such as those described in EP 416,815 and EP 420,436. Further homogeneous catalytic systems that can be supported are those based on late transition metal complexes such as those described in WO 96/23010.

The catalyst systems to be supported generally comprise an activator. In the case of metallocenes, for instance, the activator can be an alumoxane or a ionising activator capable of forming an alkyl metallocene cation. Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO). Non limitative examples of ionising activators are compounds of formula $T^+D^-$, wherein $T^+$ is a Broensted acid, able to give a proton and to react irreversibly with a σ-bonded substituent of the metallocene, and $D^-$ is a compatible anion, which does not co-ordinate, which is able to stabilise the active catalytic species originating from the reaction of the two compounds and which is sufficiently labile to be removed from an olefinic substrate. Preferably, the anion $D^-$ comprises one or more boron atoms. More preferably, the anion $D^-$ is an anion of the formula $BAr^{(-)}_4$, wherein substituents Ar, the same or different from each other, are aryl radicals such as phenyl, pentafluorophenyl, bis(trifluoromethyl)phenyl. Particularly preferred is the tetrakis-pentafluorophenyl borate. Furthermore, compounds of formula $BAr_3$ can be suitably used.

The supported catalyst may be prepared in a variety of ways. The metallocene can be dissolved in a solvent either separately from or together with the activator and/or the monomer and vice versa. The deposition of the catalytic system components on the support can be made in any possible order. Suitable solvents for preparing a metallocene-based catalyst solution are liquid aliphatic or aromatic hydrocarbons, such as toluene.

The ratio of the total volume of the catalyst (in the sense of catalytic system) solution employed in the process of the invention to the total pore volume of the support may be in the range of from about 4 to about 20.

The mole ratio of the metal of the activator to the transition metal of the metallocene is in the range of ratios between 1:1 and 1000:1, more preferably 20:1 to 500:1, and most preferably 50:1 to 250:1. If the activator is an ionising activator, the mole ratio of the metal of the activator to the transition metal is preferably in the range of ratios between 0.3:1 and 3:1.

When the catalyst is a metallocene and the activator is an alumoxane such as methylalumoxane, according to a preferred embodiment the process is carried out in at least two phases: in a first phase all the metallocene compound together with part of the alumoxane is contacted with the support, and in a second phase the remaining amount of alumoxane is contacted with the solid support. As an example ¾ of the totally employed amount of alumoxane is employed in the first step and the remaining ¼ in the second.

If the catalyst system comprises two different metallocene compounds, they may suitably be contacted separately in two different phases: in a first phase one metallocene is contacted with the solid support, and in the second phase the other metallocene is contacted with the solid support. As an example, a solution comprising the first metallocene and about half of the totally employed amount of alumoxane is employed in the first step, and a solution comprising the other metallocene and about half of the totally employed amount of alumoxane is employed in the second step. Or better, the alumoxane can be contacted with the solid support, part along with one metallocene in the first phase, part along with the other metallocene in the second phase, and part in a further contacting phase. As an example, a solution comprising the first metallocene and about ⅜ of the totally employed amount of alumoxane is employed in the first step, a solution comprising the other metallocene and about ⅜ of the totally employed amount of alumoxane is employed in the second step and a solution containing the remaining alumoxane in a further contacting step.

The contacting vessel is preferably provided with means for mixing the support, while the solution is introduced, in order to avoid overwetting of the support and the agglomeration of the particles. Any suitable means of mixing or agitation may be used. Such means include mixers and agitators with one or more extending arms. The arms may be of any shape, length and orientation. The means for mixing the support and the stirring conditions must be chosen so as to minimise the breakage or fracturing of the support, in order to avoid considerable generation of fines. The catalyst solution may be poured into the contacting vessel by means of a dosing pump or any other possible system able to dose a liquid. There is no need of spraying the solution or of producing a mist or fog or aerosol. The solution may enter the vessel through one or more points; small pipes can be used to introduce the solution into the vessel. The position of the feed point(s) into the contacting vessel may be over or under the solid bed. Means for discharging the solid with a controlled flow rate are necessary to control the dosing rate of the solution. In fact the ratio of the liquid flow rate to the recirculating solid flow rate is set in order to just fill the pore volume and to maintain a free-flowing solid. Any means for dosing solid particles, such as a screw or a cup, are suitable. The means for discharging the support must be chosen so as to reduce as most as possible the breakage of the support.

The impregnation of the support in the contacting vessel as well as the evaporation of the solvent in the evaporation zone may be carried out at any pressure, over any period of time and at any temperature, provided the temperature of the solution and/or support is maintained such that the components of the catalyst solution do not decompose and the solution does not solidify.

According to a preferred embodiment, the contacting vessel is shaped as a vertical column through which the solid flows downward in a packed form. The contacting vessel as well as the evaporation zone are preferably equipped with a thermostatic jacket, in order to carry out the impregnation and the evaporation of the solvent at the desired temperature. It has to be noted that the process of the present invention allows a separate regulation of the temperature upon the contacting and the evaporation, so that an optimal temperature can be chosen for both the process steps. The evaporation zone can be a pipe or more pipes arranged in parallel. A possible scheme of the process of the invention is illustrated in FIG. 1. The porous support is loaded into the contacting column 1, from which it is discharged by a screw valve 3 and is pneumatically conveyed through the column 2 and finally recirculated to the column 1 by means of an inert gas stream introduced by pipe 4. The catalyst solution is fed by means of a dosing pump 8 into column 1 where it is contacted with the porous support. A mechanical stirrer 5 is used to improve the contact between the liquid and the porous particles. The ratio between the recirculating solid and the poured liquid is lower than that needed to fill the pores, so that nowhere in the column local excess of liquid can be generated. The volume of solution fed into the contacting vessel is preferably comprised between 20 and 80%, more preferably it is from 50 to 60% of the total pore volume of the solid fed into the contacting vessel, especially when continuous operation is performed in an industrial-scale plant. The column 2 is heated in order to evaporate the solvent that is removed by the inert gas flow. The upper part 7 of column 1 is used as separator of the solid from the gas containing the evaporated solvent. Alternatively, it is possible to separate the solid from the gas stream before it enters the column 1 by means of a cyclone or any other suitable device. The gas stream of inert gas and solvent vapours goes to a condensation zone 6 to separate the solvent from the inert gas, while the separated solid flows again through column 1 where it is contacted with another volume of catalyst solution. Columns 1 and 2 are both equipped with a thermostatic jacket. The preparation of the supported catalyst is completed when all the components of the catalytic system have been deposited on the support. It is possible to deposit all the catalyst components together or in subsequent impregnation processes, depending on the characteristics of the catalyst system. If the catalyst system does not undergo decay after contacting with all the catalyst components, it is generally preferred to deposit all the catalyst components together. The dried solid can be unloaded as it is or it can be prepolymerized using one or more alpha-olefins in gas-phase, either in the same equipment or in a different reactor. The prepolymerisation may also be carried out in slurry phase. When a metallocene is used as a catalyst component, the prepolymerisation may be particularly advisable in order to prevent the successive leaking of the catalyst, which can generate fouling during the polymerisation process.

In case of continuos operation, the solid is continuously fed to column 1 by any suitable dosing device and it is continuously withdrawn generally at a point between the exit from column 2 and the reintroduction into column 1. Means for separating the withdrawn solid from the accompanying gas must be provided. If the whole recycle stream undergoes separation before reintroduction into column 1, it is sufficient to discharge a part of the separated solid.

According to another aspect, the present invention relates to an apparatus comprising a contacting vessel 1 equipped with a mechanical stirring device 5 and means 3 for discharging a solid in particle form from vessel 1, a line 4 for introducing gas at a point after the discharging means 3, an evaporation zone 2, preferably jacketed for thermostatic control, means 8 for introducing a catalyst solution into the vessel 1, means 7 for separating the particulate solid from the gas stream. Preferably, a condenser 6 is also provided to separate the solvent from the gas stream coming from the means 7 for separating the solid from the gas stream. Also the contacting vessel 1 is preferably jacketed for temperature control.

If the apparatus is used for continuous operation, means for continuously introducing the solid into the vessel 1 and for withdrawing solid after the evaporation zone 2 must also be provided. According to a preferred embodiment the apparatus is also provided with a further evaporation zone placed downstream of the point of discharge of the solid. The following examples will further illustrate the present invention without limiting its scope.

EXAMPLES

Characterisations

POROSITY: determined by immersing a known quantity of the sample in a known quantity of mercury inside a dilatometer and then gradually increasing the mercury pressure hydraulically. The pressure of introduction of the mercury into the pores is function of the pore diameter. Measurements were effected using a "Porosimeter 2000 series" from Carlo Erba. The porosity, pore distribution and surface area were calculated from the data of decrease of the volume of mercury and from the values of the applied pressure.

MELT INDEX "L": ASTM-D 1238, method L.

INTRINSIC VISCOSITY: in tetrahydronaphtalene at 135° C.

BULK DENSITY: DIN-53794.

AVERAGE PARTICLE SIZE (APS): determined with a method based on the principle of optical diffraction of monochromatic laser light with the "Malvern Instr. 2600" apparatus. The mean size is stated at P50.

Preparation of the Supported Catalysts

Supported catalysts were prepared using the equipment illustrated in FIG. 1 operating in a semi-continuous way. The flow of the solid through the apparatus was regulated in order to assure an average number of passages through the contacting vessel between 10 and 30.

Example 1

Under nitrogen, 280 ml of 100 g/l methylalumoxane solution in toluene was added to 1.9 g of rac-CH$_2$(3-tert-butyl-1-indenyl)$_2$ZrMe$_2$ to form the catalyst solution. Separately, 135 g of a porous polyethylene prepolymer (pore volume 0.335 ml/g excluding macropores, APS 152 μm) obtained from a Ziegler-Natta catalyst, previously steamed to deactivate the catalyst residues and then dehydrated in a stream of flowing nitrogen at 110° C., was loaded in the equipment of FIG. 1. The jacket temperature of column 1 was set to 55° C. and that of column 2 was set to 110° C. The agitator of column 1 was activated and recirculation of the solid in the loop reactor was initiated by opening the nitrogen flow through column 2. The dosing of the solution was initiated by activating the dosing pump. All the solution was added to the support in 2 hours; at the end of this time, the support was maintained in recirculation for 15 minutes without adding any other liquid to eliminate the last traces of solvent. During all the addition time, the support was finely divided and free-flowing. The analysis of the final catalyst was 6.3 wt. % Al and 0.2 wt. % Zr with an Al/Zr molar ratio of 106.

Example 2

Using the procedure of example 1, a solution was prepared by adding 200 ml of the 100 g/l methylalumoxane solution to 1.9 g of rac-CH$_2$(3-tert-butyl-1-indenyl)$_2$ZrMe$_2$. 135 g of the same polyethylene prepolymer previously treated as described in example 1 were loaded in the same equipment. The jacket of the two columns was heated at the desired temperature and the solid was fluidised in the circulating reactor. The solution was added to the support in 90 minutes. Immediately after other 80 ml of the 100 g/l MAO solution were added to the supported catalyst to reach the desired amount of supported methylalumoxane. Once finished the addition of the solution, the solid was circulated for 15 minutes to eliminate the traces of the solvent. The unloaded supported catalyst had the following analysis: 6.9 wt. % Al and 0.22 wt. % Zr with an Al/Zr molar ratio of 106.

Example 3

Using the procedure of example 1, a solution was prepared under nitrogen adding 7000 ml of a methylalumoxane solution 100 g/l in toluene to 60 g of rac-dimethylsilylenbis(2-methyl-4-phenyl-1-indenyl)ZrCl$_2$. 2100 g of a polypropylene prepolymer (porosity 0.386 g/ml excluding macropores, APS 142 μm), previously steamed and dehydrated were loaded in an equipment similar to that of example 1 but of larger scale. The jacket of the column 1 was heated to 50° C., that of column 2 was heated to 110° C., and the solid was recirculated into the apparatus. The solution was added to the support by dosing the liquid with a dosing pump trough 4 different feed points in order to better distribute the liquid and improve the contact between the liquid and the porous solid. The solution was fed in 3 hours, after this time the catalyst was recirculated for extra 30 minutes to remove the last traces of solvent. The unloaded supported catalyst had the following composition: 8.5% wt. Al and 0.28% wt. Zr with an Al/Zr molar ratio of 102. Part of the unloaded catalyst was transferred to a fluidised bed reactor to be prepolymerised with ethylene. The polymerisation was performed at 50° C., 120 kPa, in a stream of propane/ethylene (10% molar fraction of ethylene) for 2 hours to obtain a productivity of 1.1 g/g. The composition of the prepolymerised catalyst was 7.65% wt. Al and 0.26% wt. Zr.

Example 4

Under nitrogen, the cocatalyst solution was prepared by adding 40 ml of pure tri-iso-octylaluminium to 200 ml of a methylalumoxane solution 100 g/l in toluene and let to react for 30 minutes. This solution was added to 1.95 g of (Me$_3$SiCP)$_2$ZrCl$_2$ to obtain the catalytic solution. Using the procedure described in example 1, 250 g of a polyethylene prepolymer were loaded in the same equipment. The jacket of column 1 was heated to 50° C. and that of column 2 to 90° C. The solution was dosed in 2 hours to the recirculating support. The supported catalyst was circulated for 15 more minutes to completely dry it. The obtained catalyst had the following analysis: 2.7% wt. Al and 0.14% wt. Zr with an Al/Zr molar ratio of 65.

Polymerisations

Examples 5–7

Catalyst samples as prepared in examples 1–3 were used for propylene polymerisations as described below. Batch polymerisations were carried out in a 4 l stirred autoclave. 1200 g of liquid monomer were loaded at 30° C., followed by 1.16 ml of a TEAL solution 100 g/l in hexane used as a scavenger. The polymerisation was started by injecting the catalyst into the autoclave at 30° C., by means of nitrogen overpressure, then the temperature was raised up to 60° C. in 10 minutes and maintained for 2 hours. The polymerisation was stopped by venting and cooling the reactor. No significant fouling was observed. The product obtained was collected and dried in an oven flushed with nitrogen at 70° C. for 3 hours. The polymerisation data and properties of the polymer samples are reported in Table 1.

Example 8

A sample of catalyst as prepared in example 4 was used for ethylene polymerisation as described below. A 4 l stirred autoclave was used. The catalyst was suspended in 5 ml of hexane and charged into the autoclave containing 1.5 l of liquid hexane at 30° C., the autoclave was pressurised with ethylene at a total pressure of 1100 kPa. 1.16 ml of a TEAL solution 100 g/l in hexane was used as scavenger and fed into the reactor before adding the catalyst and starting the polymerisation. The temperature was raised up to 80° C. in 10 minutes and maintained for 2 hours. Finished the polymerisation the reactor was cooled and vented. No significant fouling was observed. The product obtained was collected and dried in an oven flushed with nitrogen at 70° C. for 3 hours. The polymerisation data and properties of the polymer samples obtained are reported in Table 1.

TABLE 1

| | EXAMPLE | | | |
|---|---|---|---|---|
| | 5 | 6 | 7 | 8 |
| Catalyst | ex. 1 | ex. 2 | ex. 3 | ex. 4 |
| Pressure (kPa) | 2800 | 2800 | 2800 | 1100 |
| Temperature (° C.) | 60 | 60 | 60 | 80 |
| Monomer | $C_3H_6$ | $C_3H_6$ | $C_3H_6$ | $C_2H_4$ |
| Productivity (g/g) | 780 | 1000 | 3000 | 690 |
| Melt index "L" (g/10 min) | 50.4 | 61 | <0.1 | — |
| Intrinsic viscosity (dl/g) | — | — | — | 8.8 |
| Melting point (° C.) | 151.6 | 156 | 146.8 | — |
| Bulk density (g/ml) | 0.381 | 0.420 | 0.370 | 0.374 |
| APS (μm) | 1649 | 1639 | 2160 | 1374 |

What is claimed is:

1. A process for preparing a supported catalyst comprising the steps of:
    (a) preparing a catalyst solution comprising a soluble catalyst component;
    (b) introducing into a contacting vessel:
        (i) a porous support material in particle form, and
        (ii) a volume of the catalyst solution not greater than the total pore volume of the porous support material introduced;
    (c) discharging the solid material resulting from step (b) from the contacting vessel and introducing it into an evaporation zone where it is suspended in an inert gas flow under such conditions that the solvent evaporates; and
    (d) reintroducing at least part of the material resulting from step (c) into the contacting vessel together with another volume of the catalyst solution not greater than the total pore volume of the reintroduced material.

2. The process according to claim 1 wherein the material resulting from step (d) is subjected to further cycles of steps (c) and (d).

3. The process according to claim 1 wherein the contacting vessel is kept under stirring.

4. The process according to claim 1 wherein the operations are carried out continuously and wherein the porous support material is continuously fed and the solid material resulting from step (b) is continuously discharged at any suitable point where the circulating solid flows, the inert gas is continuously fed at a point subsequent to the point of discharge of the solid material from the contacting vessel, and the inert gas containing solvent is withdrawn from any suitable point.

5. The process according to claim 1 wherein the volume of the catalyst solution fed into the contacting vessel is from 20 to 80% of the total pore volume of the porous support material fed into the contacting vessel.

6. The process according to claim 5 wherein the volume of the catalyst solution fed into the contacting vessel is from 50 to 60% of the total pore volume of the porous support material fed into the contacting vessel.

7. The process according to claim 1 wherein the contacting vessel is a column jacketed for temperature control and provided with a mechanical stirring device.

8. The process according to claim 1 wherein the evaporation zone is a pipe provided with a jacket for temperature control.

9. The process according to claim 1 wherein the inert gas is nitrogen.

10. The process according to claim 1 wherein the contacting vessel is equipped with a screw valve for the withdrawal of the solid material.

11. The process according to claim 1 wherein the catalyst solution comprises a metallocene compound.

12. The process according to claim 11 wherein the catalyst solution comprises an aluminium alkyl compound.

13. The process according to claim 1 wherein the porous support material is a porous polyolefin prepolymer.

14. The process according to claim 13 wherein the prepolymer has a porosity of at least 0.3 ml/g.

15. The process according to claim 14 wherein the prepolymer has a porosity of at least 1.5 ml/g.

16. The process according to claim 11 wherein the solvent of the catalyst solution is an inert hydrocarbon solvent.

17. The process according to claim 12 which is carried out in a first phase when all the metallocene compound together with part of the aluminium alkyl compound is contacted with the porous support material, and in a second phase when the remaining amount of aluminium alkyl compound is contacted with the porous support material.

18. The process according to claim 11 wherein two different metallocene compounds are used, the said process being carried out in a first phase when one metallocene is contacted with the porous support material, and in the second phase when the other metallocene is contacted with the porous support material.

19. The process according to claim 18 wherein an aluminium alkyl compound is contacted with the porous support material, part along with one metallocene in the first phase, part along with the other metallocene in the second phase, and part in a further contacting phase.

20. An apparatus comprising a contacting vessel, equipped with a mechanical stirring device and means for discharging a solid in particle form from the contacting vessel, a line for introducing gas at a point after the discharging means, an evaporation zone, means for introducing a catalyst solution into the contacting vessel, and means for separating the particulate solid from the gas stream.

21. The apparatus according to claim 20, wherein the contacting vessel and the evaporation zone are jacketed for temperature control.

22. The apparatus according to claim 20 wherein a condenser is provided to separate the solvent of the catalyst solution from the gas stream coming from the means for separating the solid from the gas stream.

23. The apparatus according to claim 20 which is provided with means for continuously introducing the solid into the contacting vessel and for continuously discharging the solid at a point where it has come out from the evaporation zone.

24. The apparatus according to claim 23 which is provided with a further evaporation zone placed downstream of the point of discharge of the solid.

* * * * *